US008044604B2

(12) United States Patent
Hagino et al.

(10) Patent No.: US 8,044,604 B2
(45) Date of Patent: Oct. 25, 2011

(54) INVERTER (75) Inventors: Junichi Hagino, Kyoto (JP); Kenichi Fukumoto, Kyoto (JP)

(73) Assignee: Rohm Co., Ltd. (JP)

( * ) Notice: Subject to any disclaimer, the term of this patent is extended or adjusted under 35 U.S.C. 154(b) by 422 days.

(21) Appl. No.: 12/420,274

(22) Filed: Apr. 8, 2009

(65) Prior Publication Data
US 2009/0251062 A1 Oct. 8, 2009

(30) Foreign Application Priority Data

Apr. 8, 2008 (JP) .................................. 2008-100740

(51) Int. Cl.
*H05B 41/26* (2006.01)
*H02M 3/24* (2006.01)
*G02F 1/1335* (2006.01)

(52) U.S. Cl. .............................. 315/276; 363/95; 349/70
(58) Field of Classification Search .......................... None
See application file for complete search history.

(56) References Cited

U.S. PATENT DOCUMENTS

| 7,236,377 B2 * | 6/2007 | Fukumoto | 363/21.09 |
| 7,944,652 B2 * | 5/2011 | Fukumoto | 361/23 |
| 2004/0130921 A1 * | 7/2004 | Fukumoto | 363/98 |

FOREIGN PATENT DOCUMENTS

JP 2003-323994 A 11/2003
* cited by examiner

*Primary Examiner* — Shawki S Ismail
*Assistant Examiner* — Crystal L Hammond
(74) *Attorney, Agent, or Firm* — Cantor Colburn LLP (57) ABSTRACT

A soft start circuit generates a soft start voltage which changes over time when light emission of an EEFL is started. A pulse modulator receives a feedback voltage that corresponds to the output voltage of an inverter and the soft start voltage, and adjusts the duty ratio of a pulse signal PWM such that these two voltages match one another using a feedback operation. A striking control circuit monitors an error signal which is asserted when an abnormal state occurs. In a case in which the error signal has been asserted at a detection timing after the soft start voltage has reached a target voltage, the striking control circuit resets and restarts the soft start circuit. A driver controls the switching of the voltage at the primary coil of a transformer according to the pulse signal received from the pulse modulator.

7 Claims, 8 Drawing Sheets

INVERTER

BACKGROUND OF THE INVENTION

1. Field of the Invention

The present invention relates to an inverter which supplies driving voltage to an external electrode fluorescent lamp.

2. Description of the Related Art

In recent years, liquid crystal display TVs, which provide a TV having a thin shape and a large size, are becoming popular as replacements for CRT-based TVs. Liquid crystal display TVs include multiple cold cathode fluorescent lamps (which will be referred to as "CCFLs" hereafter) or external electrode fluorescent lamps (which will be referred to as "EEFLS" hereafter) arranged on the back face of a liquid crystal panel on which video images are to be displayed, which are used as light-emitting backlights.

The CCFL or EEFL is driven using an inverter (DC/AC converter) which boosts DC voltage of around 12 V, and which outputs the voltage thus boosted in the form of AC voltage, for example. The inverter converts the current flowing through the CCFL into voltage, and returns the voltage thus converted to a control circuit as a feedback voltage, thereby controlling the ON/OFF operation of a switching element based upon this feedback voltage. For example, a CCFL driving technique using such an inverter is disclosed in Patent document 1.

[Patent Document 1]

Japanese Patent Application Laid Open No. 2003-323994

EEFLs have a problem in that it is difficult to turn on an EEFL as compared with other fluorescent lamps such as CCFLs. Whether or not the EEFL is switched to a light-emission state is a matter of probability. Accordingly, in order to ensure that the EEFL emits light, conventional inverters repeatedly perform a start-up operation several times, thereby raising the probability of light emission. Specifically, in order to perform EEFL striking, conventional inverters repeatedly perform an operation in which high voltage is applied to the inverter and the inverter is shut down.

Such conventional techniques require an external circuit which repeatedly performs the shut down operation and the start-up operation of a control circuit for the inverter, in addition to the control circuit. This leads to a large circuit area and high costs.

SUMMARY OF THE INVENTION

The present invention has been made in order to solve the aforementioned problem. Accordingly, it is a general purpose of the present invention to provide a low-cost or small-area control circuit for an inverter which allows an EEFL to emit light in a sure manner.

An embodiment of the present invention relates to a control circuit for an inverter which drives an external electrode fluorescent lamp (EEFL) connected to a secondary line of a transformer. The control circuit includes: a soft start circuit which generates a soft start voltage which changes over time when igniting the EEFL; a pulse modulator which receives a feedback voltage that corresponds to the output voltage of the inverter and the soft start voltage, and which adjusts the duty ratio of a pulse signal such that the feedback voltage matches the soft start voltage; a driver which controls the switching of the voltage at a primary coil of the transformer according to the pulse signal output from the pulse modulator; and a striking control circuit which monitors an error signal which is asserted when an abnormal state occurs, and which resets and restarts the soft start circuit when the error signal has been asserted at a detection timing after the soft start voltage has reached a threshold voltage.

With such an embodiment, the striking operation for the EEFL is performed using the soft start circuit. Thus, there is no need to provide an external circuit for the striking operation. Such an embodiment allows the EEFL to emit light in a sure manner using a simple configuration. Furthermore, only in a case in which an error signal has been asserted after the completion of the soft start period in which the soft start voltage is raised, the soft start circuit is reset and the striking operation is performed. Thus, such an embodiment prevents the striking operation when the EEFL is emitting light.

Also, the striking control circuit may include a counter which counts the number of times the soft start circuit has been reset. Also, in a case in which the count value has reached a predetermined value, the soft start circuit may be prevented from being reset. Such an arrangement is capable of limiting the number of times the striking operation is performed.

Such an arrangement may allow the predetermined value to be selected from among multiple values. In this case, by setting the number of times the striking operation can be performed according to the probability that the EEFL will emit light, such an arrangement allows the EEFL to emit light in a sure manner.

Also, the soft start circuit may include: a capacitor, one terminal of which is set to a fixed electric potential; a current source which charges the capacitor; and a first comparator which compares the soft start voltage, which occurs at the other terminal of the capacitor, with a predetermined first threshold voltage. Also, when the soft start circuit is reset, the striking control circuit may switch an initializing switch, provided between the one terminal of the capacitor and a fixed voltage terminal, to the ON state, and when the soft start voltage is reduced to a predetermined threshold voltage, the striking control circuit may switch the initializing switch to the OFF state.

Another embodiment of the present invention relates to an inverter. The inverter includes: a transformer; any one of the above-described control circuits which control the switching of the voltage at the primary coil of the transformer; and a voltage detection unit which detects the output voltage of the inverter, which is generated at the secondary coil of the transformer, and which outputs a voltage that corresponds to the output voltage to the control circuit.

Yet another embodiment of the present invention relates to a light emitting apparatus. The light emitting apparatus includes an EEFL and the above-described inverter which supplies the output voltage thereof to the EEFL.

Yet another embodiment of the present invention relates to a liquid crystal display apparatus. The liquid crystal display apparatus includes: a liquid crystal panel; an EEFL provided as a backlight for the liquid crystal panel; and the above-described inverter, the output voltage of which is supplied to the EEFL.

Yet another embodiment of the present invention relates to a control method for an inverter which drives an EEFL. The control method includes: generating a soft start voltage which changes over time when igniting the EEFL; adjusting the duty ratio of a pulse signal such that a feedback voltage that corresponds to the output voltage of the inverter matches the soft start voltage; controlling the switching of the voltage at a primary coil of a transformer according to the pulse signal; and monitoring an error signal which is asserted when an abnormal state occurs, and striking the EEFL by initializing the soft start voltage and by changing the soft start voltage over time when the error signal has been asserted at a detection timing after the soft start voltage has reached a threshold voltage.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B. In the same way, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Also, each symbol which denotes the corresponding terminal (pin) is also used as a symbol which indicates the signal output from the terminal.

Figure 1:
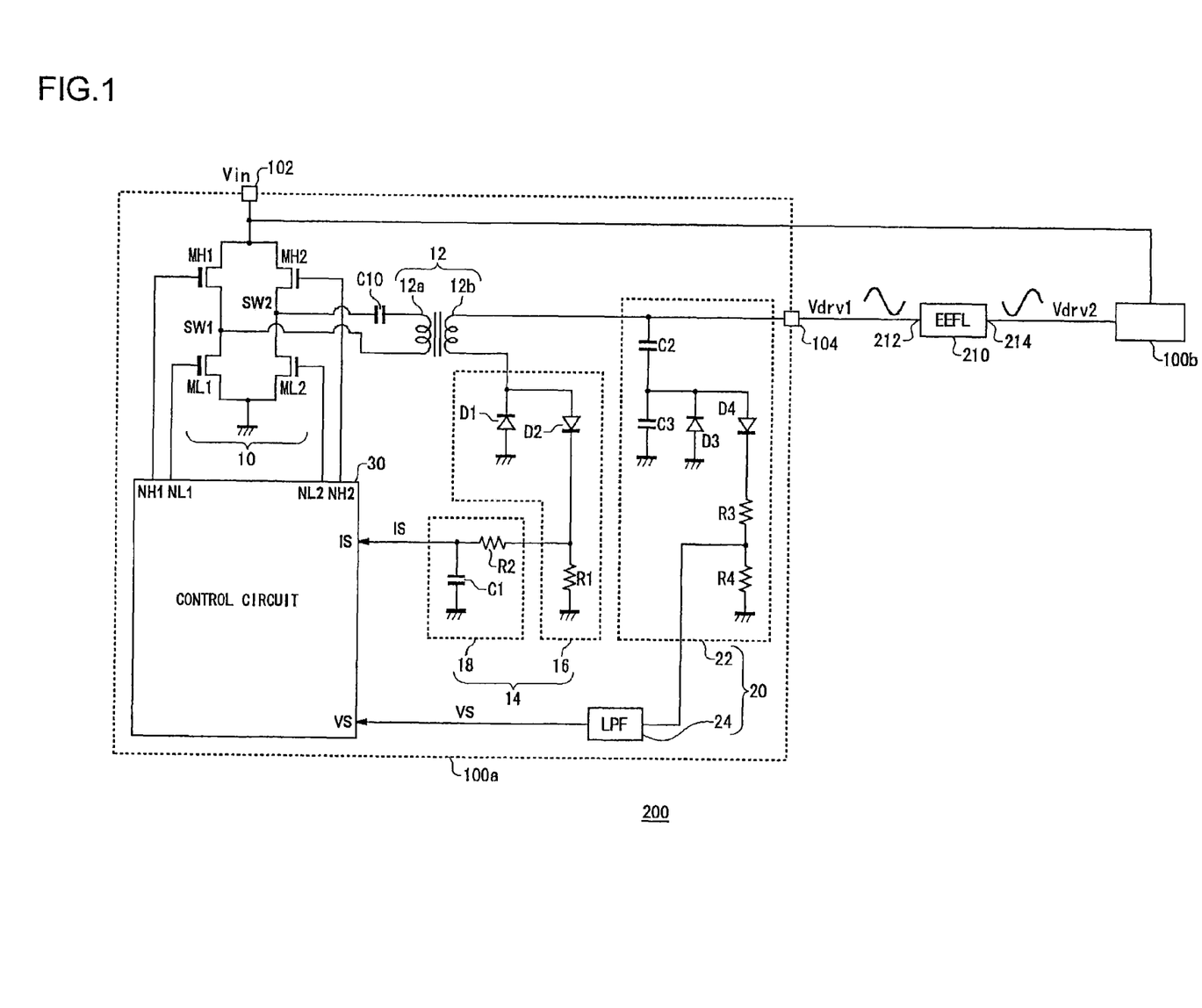
FIG. 1 is a circuit diagram which shows a configuration of a light emitting apparatus according to an embodiment of the present invention.
Figure 2:
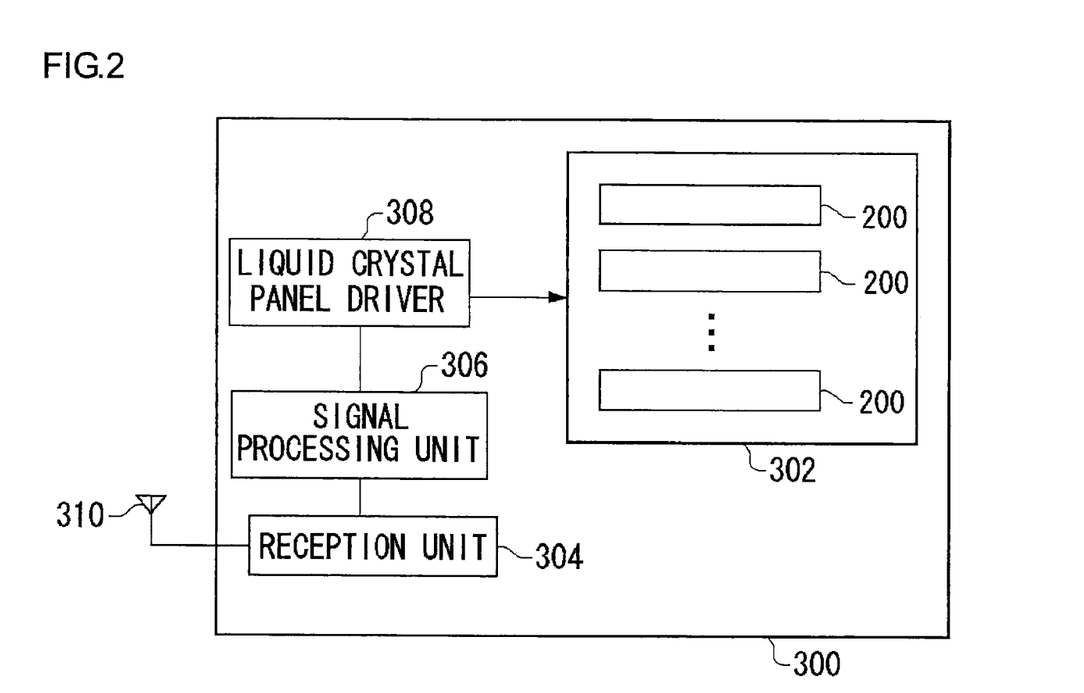
FIG. 2 is a block diagram which shows a configuration of a liquid crystal display TV mounting the light emitting apparatus shown in FIG. 1.

FIG. 1 is a circuit diagram which shows a configuration of a light emitting apparatus 200 according to an embodiment of the present invention. FIG. 2 is a block diagram which shows a configuration of a liquid crystal display TV 300 mounting the light emitting apparatus 200 shown in FIG. 1. The liquid crystal display TV 300 is connected to an antenna 310. The antenna 310 receives broadcast waves, and outputs a received signal to a reception unit 304. The reception unit 304 detects and amplifies the received signal, and outputs the received signal thus detected and amplified to a signal processing unit 306. The signal processing unit 306 demodulates the modulated data, and outputs the image data obtained by the demodulation to a liquid crystal panel driver 308. The liquid crystal panel driver 308 outputs the image data to a liquid crystal panel 302 in increments of scanning lines, thereby displaying video images and still images. Multiple light emitting apparatuses 200 are arranged as a backlight on the back face of the liquid crystal panel 302. The light emitting apparatus 200 according to the present embodiment is suitably employed as a backlight for such a liquid crystal panel 302. Returning to FIG. 1, detailed description will be made below regarding the configuration and the operation of the light emitting apparatus 200.

The light emitting apparatus 200 according to the present embodiment includes an EEFL 210, a first inverter 100a, and a second inverter 100b. The EEFL 210 is arranged on the back face of the liquid crystal panel 302. The first inverter 100a and the second inverter 100b are DC/AC converters which convert the input voltage Vin, which is output from a DC power supply and is input to an input terminal 102, into AC voltages, boost the AC voltages thus converted, and supply the AC voltages thus boosted to a first terminal 212 and a second terminal 214 as a first driving voltage Vdrv1 and a second driving voltage Vdrv2, respectively. The first driving voltage Vdrv1 and the second driving voltage Vdrv2 are AC voltages having opposite phases.

In FIG. 1, a single EEFL 210 is shown. Also, multiple EEFLs 210 may be arranged in parallel. Description will be made below regarding the configuration of the first inverter 100a and the second inverter 100b according to the present embodiment. The first inverter 100a and the second inverter 100b have the same configuration. Accordingly, description will be made below with these inverters collectively referred to as the "inverter 100" without distinguishing the one from the other.

The inverter 100 includes an H-bridge circuit 10, a transformer 12, a current/voltage conversion unit 14, a driving voltage detection unit 20, a control circuit 30, and a capacitor C10.

The H-bridge circuit 10 includes four power transistors, i.e., a first high-side transistor MH1, a first low-side transistor ML1, a second high-side transistor MH2, and a second low-side transistor ML2.

One terminal of the first high-side transistor MH1 is connected to the input terminal 102 to which the input voltage Vin is applied, and the other terminal thereof is connected to the first terminal of a primary coil 12a of the transformer 12. One terminal of the first low-side transistor ML1 is connected to the ground terminal at which the electric potential is set to a fixed electric potential, and the other terminal thereof is connected to the first terminal of the primary coil 12a. One terminal of the second high-side transistor MH2 is connected to the input terminal 102, and the other terminal thereof is connected to the second terminal of the primary coil via the DC-current blocking capacitor C10. One terminal of the second low-side transistor ML2 is connected to the ground terminal, and the other terminal thereof is connected to the second terminal of the primary coil 12a via the DC-current blocking capacitor C10.

The current/voltage conversion unit 14 is provided on a current path of a secondary coil 12b of the transformer 12. The current/voltage conversion unit 14 converts the current flowing through the secondary coil 12b, i.e., the current flowing through the EEFL 210, into voltage, and outputs the voltage thus converted as a current detection signal IS. The current/voltage conversion unit 14 includes a rectification circuit 16 and a filter 18.

The rectification circuit 16 includes diodes D1 and D2 and a resistor R1. The anode of the diode D1 is grounded, and the cathode thereof is connected to one terminal of the secondary coil 12b. The anode of the diode D2 is connected to the cathode of the diode D1. The resistor R1 is provided between the cathode of the diode D2 and the ground. The AC current that flows through the secondary coil 12b is half-wave rectified by the diodes D1 and D2, and the current thus half-wave rectified flows through the resistor R1. A voltage drop occurs at the resistor R1 in proportion with the current that flows through the secondary coil 12b. The rectification circuit 16 outputs the voltage drop that occurs at the resistor R1.

The filter 18 is a low-pass filter including a resistor R2 and a capacitor C1. The filter 18 feeds back the current detection signal IS, which is obtained by removing a high-frequency component from the output voltage of the rectification circuit 16, to a current feedback terminal IS of the control circuit 30.

The driving voltage detection unit 20 has a configuration including a rectification circuit 22 and a filter 24, and is provided between an output terminal 104 of the inverter 100 and the ground. The driving voltage detection unit 20 generates, in the form of a DC voltage, a voltage detection signal VS that corresponds to the driving voltage Vdrv output from the inverter 100, and feeds back the voltage detection signal VS to a voltage feedback terminal VS of the control circuit 30.

The rectification circuit 22 includes capacitors C2 and C3, diodes D3 and D4, and resistors R3 and R4. The capacitors C2 and C3 are connected in series between the output terminal 104 and the ground. The anode of the diode D3 is grounded, and the cathode thereof is connected to a connection node that connects the capacitor C2 and the capacitor C3. Furthermore, the anode of the diode D4 is connected to the cathode of the diode D3. The resistors R3 and R4 are connected in series between the cathode of the diode D4 and the ground. The driving voltage Vdrv, which is output from the output terminal 104, is AC voltage, and is divided by the capacitors C2 and C3. The driving voltage Vdrv thus divided is half-wave rectified by the diodes D3 and D4, and is further divided by the resistors R3 and R4. The driving voltage thus divided by the resistors R3 and R4 is output to the filter 24.

The filter 24 feeds back the voltage detection signal VS, which is obtained by removing a high-frequency component from a signal output from the rectification circuit 22, to the control circuit 30. The filter 24 may be configured employing a resistor and a capacitor as with the filter 18.

The control circuit 30 controls the ON/OFF operations of the first high-side transistor MH1, the first low-side transistor ML1, the second high-side transistor MH2, and the second low-side transistor ML2 of the H-bridge circuit 10 according to the current detection signal IS and the voltage detection signal VS thus fed back. By controlling the H-bridge circuit 10, a switching voltage is supplied to the primary coil 12a of the transformer 12. As a result, energy conversion is performed at the transformer 12, and the first driving voltage Vdrv1 is supplied to the EEFL 210 connected to the secondary coil 12b.

Figure 3:
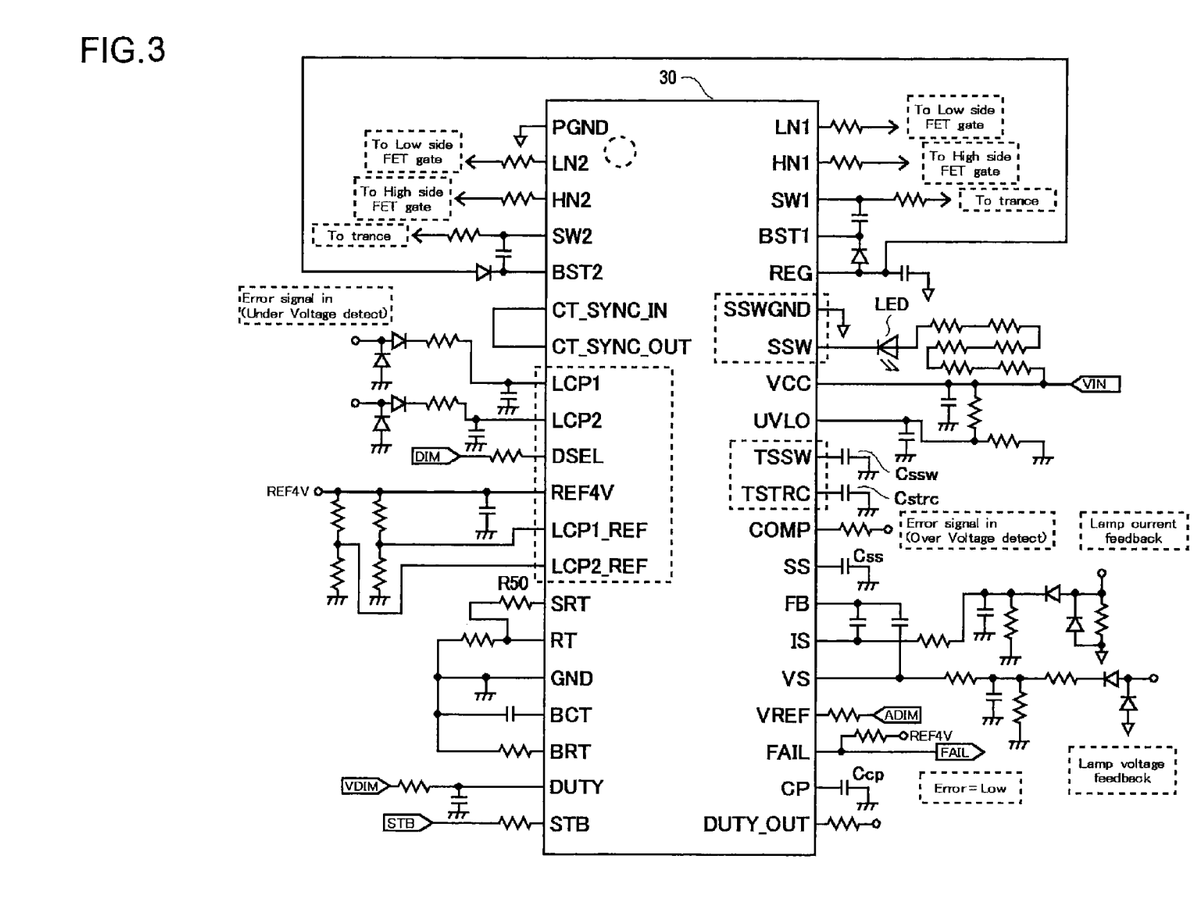
FIG. 3 is a circuit diagram which shows a configuration of a pin layout of a control circuit and a configuration of a peripheral circuit.
Figure 4:
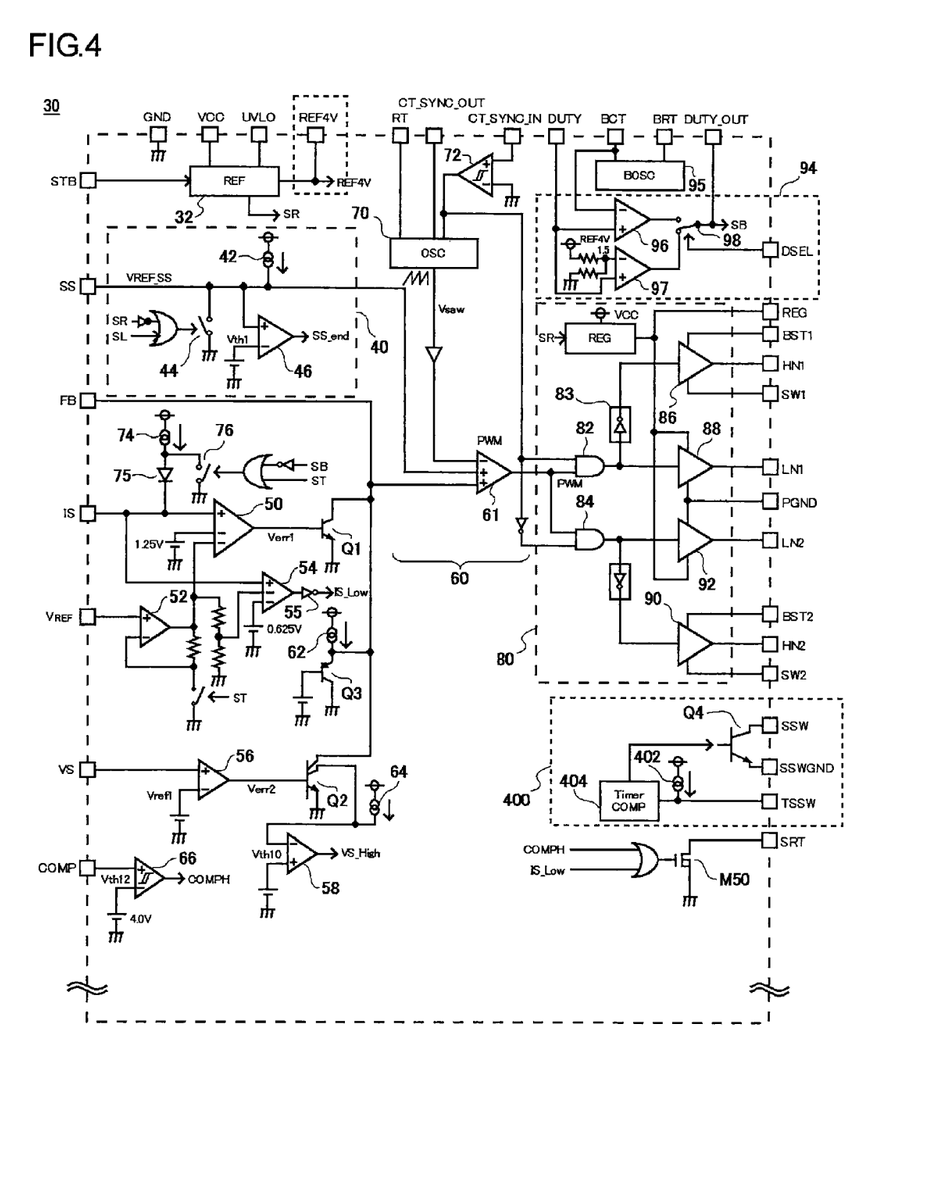
FIG. 4 is a circuit diagram which shows a part of the configuration of the control circuit.
Figure 5:
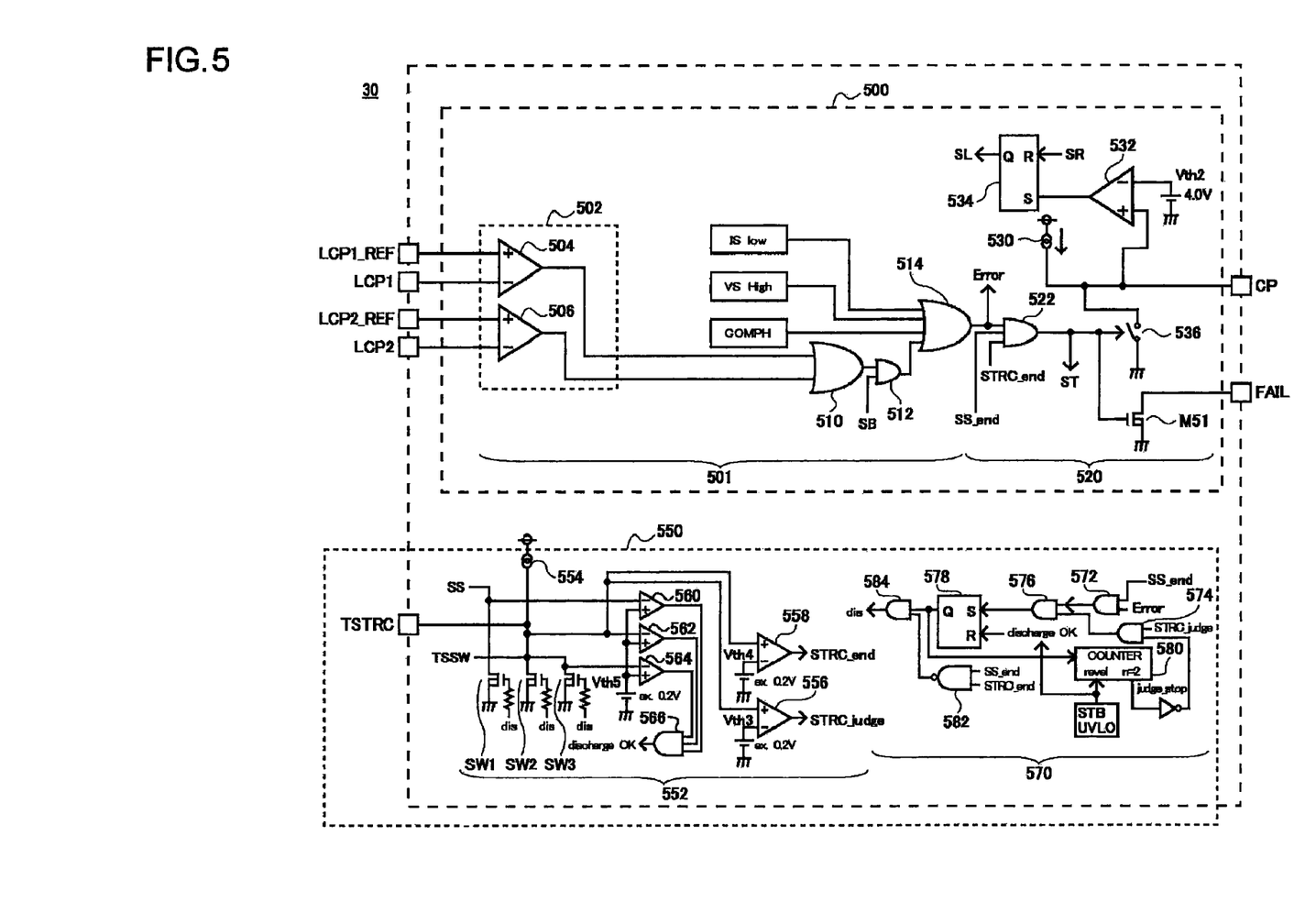
FIG. 5 is a circuit diagram which shows a part of the configuration of the control circuit.

Description will be made below regarding the configuration of the control circuit 30. FIG. 3 is a circuit diagram which shows a pin layout of the control circuit 30 and a configuration of peripheral circuits. FIG. 4 and FIG. 5 are circuit diagrams which show the configuration of the control circuit 30 according to the present embodiment.

First, referring to FIG. 4, a power supply voltage VCC is applied to a power supply terminal VCC. A ground terminal GND is connected to an external terminal at the ground electric potential. A UVLO signal, which is asserted when the power supply voltage VCC is low, is input to a low-voltage lockout terminal UVLO. A standby signal is input to a standby terminal STB. The ON/OFF operation of a reference voltage source 32 is controlled according to the standby signal STB. The reference voltage source 32 generates a reference voltage REF4V of 4V, and supplies the reference voltage REF4V to each block of the control circuit 30 and an external circuit via a terminal REF4V.

A soft start circuit 40 generates a soft start voltage VREF_SS which changes over time when the EEFL performs light emission. A soft start terminal SS is connected to a soft start capacitor Css. A current source 42 charges the soft start capacitor Css, thereby generating the soft start voltage VREF_SS which gradually rises over time. A discharge switch 44 is provided between the SS terminal and the ground, and discharges the charge stored in the soft start capacitor Css when the discharge switch 44 is in the ON state, thereby initializing the soft start voltage VREF_SS. When a latch signal SL is asserted (i.e., set to the high-level state) or a reset signal SR is negated (i.e., set to the low-level state), the discharge switch 44 is switched to the ON state.

A first comparator 46 compares the soft start voltage VREF_SS with a predetermined first threshold voltage Vth1. When VREF_SS is greater than Vth1, the first comparator 46 outputs a soft start end signal SS_end at the high level. That is to say, the soft start end signal SS_end is asserted at the timing at which the soft start operation is completed.

The current detection signal IS fed back to the feedback terminal IS is input to the non-inverting input terminal of a first error amplifier 50. The first error amplifier 50 includes two inverting input terminals, one of which receives a reference voltage of 1.25 V as an input voltage. A computation amplifier 52 is a buffer which receives a voltage VREF input from an external circuit via a reference terminal VREF. The computation amplifier 52 outputs the reference voltage VREF thus received to the other inverting input terminal of the first error amplifier 50.

The first error amplifier 50 selects the lower of the two voltages input to the two inverting input terminals, and amplifies the difference between the lower voltage thus selected and the current detection signal IS input to the non-inverting input terminal. That is to say, when the reference voltage VREF thus supplied is greater than 1.25 V, the reference voltage VREF is not used, and the feedback operation is performed such that the current detection signal IS matches the reference voltage of 1.25 V. When the reference voltage VREF is set to a voltage smaller than 1.25 V, the feedback operation is performed such that the current detection signal IS matches the reference voltage VREF. That is to say, the lamp dimming operation (current dimming) can be performed by changing the reference voltage VREF in a range smaller than 1.25 V according to an external instruction.

The control circuit 30 provides a burst dimming function. A current source 74 generates a constant current, which flows into the IS terminal via a diode 75. A switch 76 is provided between the anode of the diode and the ground terminal. When the signal obtained by inverting the burst signal SB is at the high level, or when a protection detection signal ST is at the high level, the switch 76 is set to the ON state. That is to say, the switch 76 is switched between the ON state and the OFF state according to the level of the burst signal SB.

When the switch 76 is switched to the ON state, the current generated by the current source 74 flows into the ground via the switch 76. Accordingly, the electric potential at the IS terminal is set to the current detection signal IS that corresponds to the lamp current, and the feedback operation is performed such that the current detection signal IS matches the reference voltage. When the switch 76 is switched to the OFF state, the current generated by the current source 74 flows into the IS terminal, which raises the electric potential at the IS terminal up to around the power supply voltage. This disables the feedback operation. As a result, the lamp stops light emission.

Thus, the lamp repeatedly switches the light emission state between the ON state and the OFF state according to the burst signal SB. Thus, the luminance thereof is controlled according to the duty ratio of the burst signal SB.

The burst signal SB is generated by a burst signal generating circuit 94. A burst dimming oscillator 95 generates a sawtooth wave signal having a frequency that corresponds to the capacitor connected to a BCT terminal and a resistor connected to a BRT terminal.

A duty terminal DUTY receives either an analog voltage or a cyclic signal (pulse signal) as an input signal. In a case in which the analog voltage is input, a burst dimming comparator 96 makes a comparison between the sawtooth wave signal generated at the BCT terminal and the voltage level of the duty terminal DUTY, and generates the burst signal SB. In a case in which a frequency signal is input, the burst dimming comparator 97 compares the cyclic signal with a reference voltage, and generates the burst signal SB. A selector terminal DSEL receives a logical signal as an input signal which indicates which of the analog signal or the cyclic signal is input to the DUTY terminal. A selector 98 selects the output from the burst dimming comparator 96 or from the burst dimming comparator 97 according to the level of the selector terminal DSEL. The burst signal SB thus selected by the selector 98 is supplied to the aforementioned switch 76. Furthermore, the burst signal SB is output to an external circuit via a duty output terminal DUTY_OUT. The duty ratio of the burst duty signal SB changes according to the signal supplied to the DUTY terminal, thereby allowing the luminance of the lamp to be adjusted.

An error voltage Verr1 output from the first error amplifier 50 is input to the base of a first transistor Q1.

The current detection signal IS is input to the non-inverting terminal of a current comparator 54. The current comparator 54 includes two inverting terminals, one of which receives a threshold voltage of 0.625 V as an input voltage. Furthermore, the reference voltage VREF output from the computation amplifier 52 is divided by the resistors, and the reference voltage VREF thus divided is input to the other inverting input terminal of the computation amplifier 52.

The current comparator 54 compares the current detection signal IS input to the non-inverting terminal thereof with the lower of the two voltages input to the two inverting input terminals. The output of the current comparator 54 is inverted by an inverter 55, and is output as a low current detection signal IS_Low. When the current detection signal IS becomes smaller than the threshold voltage, i.e., when the current that flows through the lamp becomes smaller than the threshold value, the low current detection signal IS_Low is asserted.

When VREF is greater than 1.25 V, the current detection signal IS is compared with the fixed threshold voltage of 0.625 V. When VREF is smaller than 1.25 V, the current detection signal IS is compared with a threshold value which is proportional to the reference voltage VREF. That is to say, in the aforementioned current dimming operation, the threshold used to detect whether or not the lamp is in the low current state can be changed according to the target value of the lamp current.

The voltage detection signal VS fed back to the feed back terminal VS is input to the non-inverting input terminal of a second error amplifier 56. A predetermined reference voltage Vref1 is input to the inverting input terminal of the second error amplifier 56. The second error amplifier 56 amplifies the difference between the voltage detection signal VS and the reference voltage Vref1. The error voltage Verr2 output from the second error amplifier 56 is input to the base of a second transistor Q2 having a grounded emitter. The second transistor Q2 includes two collector terminals.

A pulse modulator 60 includes a PWM comparator 61, an oscillator 70, and a hysteresis comparator 72. The pulse modulator 60 receives a feedback voltage FB that corresponds to the output voltage of the inverter 100 and the soft start voltage VREF_SS, and generates a pulse signal PWM having a duty ratio fed back such that the feedback voltage FB matches the soft start voltage VREF_SS.

The collector of the first transistor Q1 and one of the collectors of the second transistor Q2 are connected to each other so as to form a common terminal which is connected to the non-inverting input terminal of the PWN comparator 61. Furthermore, the common terminal thus formed is connected to the feedback terminal FB.

The third transistor Q3 is a PNP bipolar transistor, the collector of which is grounded, and the base of which receives a reference voltage. The third transistor Q3 is provided in parallel with the first transistor Q1 and the second transistor Q2. The emitter of the third transistor Q3 is connected to the collectors of the first transistor Q1 and the second transistor Q2. A current source 62 supplies a constant current to the three transistors Q1 through Q3.

The first transistor Q1 and the second transistor Q2 form a so-called minimum value circuit, which selects the lower of the two error voltages Verr1 and Verr2, and outputs the lower voltage thus selected to the non-inverting input terminal of the PWM comparator 61. The aforementioned soft start voltage VREF_SS is input to the other non-inverting terminal of the PWM comparator 61.

A current source 64 supplies a constant current to one collector of the second transistor Q2. The voltage that corresponds to the voltage detection signal VS occurs at this collector. An overvoltage detection comparator 58 compares a predetermined threshold voltage Vth10 with the collector voltage of the second transistor Q2, and outputs the comparison result as an overvoltage detection signal VS_High. When the voltage applied to the lamp is greater than the threshold voltage, the overvoltage detection signal VS_High is asserted.

An error signal, which is asserted when an overvoltage is applied, is input to a comparison terminal COMP. A hysteresis comparator 66 makes a comparison between an error signal COMP and a threshold voltage Vth12 of 4V, and outputs a comparison signal COMPH which is asserted (set to the high-level state) when an overvoltage is applied.

The oscillator 70 generates a sawtooth wave signal Vsaw, having a frequency that corresponds to a resistor connected to an RT terminal, by repeatedly performing a charge/discharge operation, and outputs the sawtooth wave signal Vsaw to the inverting input terminal of the PWM comparator 61.

The oscillator 70 is configured such that it can operate in a master mode and in a slave mode. In the slave mode, a pulse signal is input to a synchronous input terminal CT_SYNC_IN. The hysteresis comparator 72 performs wave-shaping on the pulse signal, and outputs the pulse signal thus waveshaped to the oscillator 70. The oscillator 70 generates a sawtooth wave signal Vsaw synchronously with the output signal (pulse signal) of the hysteresis comparator 72.

In the master mode, the oscillator 70 performs self-oscillation so as to generate a sawtooth wave signal Vsaw, and outputs, via a synchronous output terminal CT_SYNC_OUT, a synchronous signal that corresponds to the cycle of the sawtooth wave signal Vsaw.

The PWM comparator 61 compares the lower of the voltages input to the two non-inverting input terminals with the sawtooth wave signal Vsaw so as to generate a pulse width modulation signal (PWM signal).

A driver 80 drives the high-side transistors MH1 and MH2 and the low-side transistors ML1 and ML2, which are provided in the form of external components, according to the PWM signal. An AND gate 82 generates the logical AND of the PWM signal and the output signal of the hysteresis comparator 72. The output of the AND gate 82 is inverted by the inverter 83, and is input to a first driver 86. The first driver 86 drives the first high-side transistor MH1. A second driver 88 drives the first low-side transistor ML1 according to the output signal of the AND gate.

A second driver 90 and a second driver 92 drive the second high-side transistor MH2 and the second low-side transistor ML2, respectively.

The above-described configuration provides the soft-start operation, the current dimming operation, and the burst dimming operation.

An LED driving circuit 400 drives a light-emitting diode (LED) connected to an SSW terminal. The emitter of a fourth transistor Q4 is grounded via a ground terminal SSGND, and the collector thereof is connected to the cathode of the LED via the SSW terminal. A current source 402 charges a capacitor Cssw connected to a TSSW terminal. A timer comparator 404 compares the electric potential at the TSSW terminal with a threshold voltage Vth5 (e.g., 4 V). A timer comparator 404 sets the fourth transistor Q4 to the ON state so as to instruct the LED to emit light during a period in which the electric potential at the TSSW terminal is smaller than the threshold voltage Vth5. The LED is provided in order to raise the probability that the EEFL will emit light.

An SRT terminal is connected to the RT terminal via an external resistor R50. A transistor M50 is provided between the SRT terminal and the ground terminal. When at least one of the IS_Low signal or the COMPH signal is asserted, the transistor M50 is switched to the ON state.

Next, description will be made with reference to FIG. 5. An error detection circuit 500 includes an error signal generating unit 501 and an error cancel detection timer 520.

The error signal generating unit 501 detects whether or not an abnormal state has occurred in the inverter 100, and generates an error signal ERROR which is asserted when an abnormal state occurs.

A low-level detection circuit 502 detects whether or not voltages LCP1 and LCP2 supplied from an external circuit are smaller than predetermined threshold voltages LCP1_REF1 and LCP2_REF2, respectively. A low-level detection comparator 504 compares the reference voltage LCP1_REF with the electric potential at an LCP1 terminal, and generates a low-level detection signal which is switched to the high-level state when LCP1 is smaller than LCP1_REF. Similarly, the same applies to the operation performed by the low-level detection comparator 506. Such an arrangement allows the user of the control circuit 30 to supply desired voltages to the LCP1 terminal and the LCP2 terminal.

The outputs of the low-level detection comparators 504 and 506 are input to an OR gate 510. An AND gate 512 generates the logical AND of the output signal of the OR gate 510 and the burst signal SB. The AND gate 512 has a function of masking the result of the low-level detection using the burst signal SB. That it to say, the low-level detection is disabled during a period in which the lamp stops light emission according to the burst signal SB. An OR gate 514 receives the IS_Low signal, the VS_High signal, the COMPH signal, and the output of the AND gate 512 as input signals, and outputs the logical AND of these signals as an error signal. That is to say, in a case in which an abnormal state has occurred, the error signal ERROR is asserted.

When the state in which the error signal ERROR has been negated, i.e., the state in which an error state has not occurred, continues for a predetermined period, the error cancel detection timer 520 asserts the latch signal SL.

An AND gate 522 masks the error signal ERROR using the striking end signal STRC_end and the soft-start end signal SS_end, and outputs the error signal ERROR thus masked as a protection detection signal ST. A transistor M51 is connected to a Fail terminal in an open-drain fashion. The protection detection signal ST is input to the gate of the transistor M51. That is to say, when the protection detection signal ST is asserted, the FAIL terminal is set to the low-level state. When the protection detection signal ST is negated, the Fail terminal is set to the high-impedance state.

A capacitor Ccp is connected to a CP terminal. A current source 530 generates a constant current, and charges the capacitor Ccp. A CP-terminal comparator 532 compares the electric potential at the CP terminal with a second threshold voltage Vth2 of 4 V. The output of the comparator 532 is input to the set terminal of an RS flip-flop 534. Furthermore, the reset signal SR is input to the reset terminal of the RS flip-flop 534. That is to say, when the electric potential at the CP terminal exceeds 4 V, the RS flip-flop is set. When the reset signal SR is asserted, the RS flip-flop 534 is reset. The latch signal SL is output from the output terminal Q of the RS flip-flop 534.

An initializing switch 536 is provided between the CP terminal and the ground terminal. When the protection detection signal ST is asserted, the initializing switch 536 is switched to the ON state, which discharges the charge stored in the capacitor Ccp, thereby initializing the electric potential at the CP terminal. During a period in which the protection detection signal ST has been negated (a period in which an abnormal state has not occurred), the initializing switch 536 is maintained in the OFF state, which charges the capacitor Ccp, thereby raising the electric potential at the CP terminal over time. When the electric potential at the CP terminal reaches the second threshold voltage Vth2, the latch signal SL is asserted.

The above-described is the configuration of the error detection circuit 500.

When the light-emission operation of the EEFL is started, the control circuit 30 performs a striking operation, i.e., repeatedly performs several times an operation in which high voltage is applied to the EEFL. A striking control circuit 550 is provided in order to control the striking operation.

The striking control circuit 550 monitors the error signal ERROR which is asserted in a case in which an abnormal state has occurred. In a case in which the error signal ERROR has been asserted at a detection timing after the soft start voltage VREF_SS has reached the threshold voltage Vth1, the striking control circuit 550 resets and restarts the soft start circuit 40.

The striking control circuit 550 generates a discharge signal dis which is asserted at the reset timing. A first initializing switch SW1 is provided between an SS terminal and the ground terminal. When the first initializing switch SW1 is switched to the ON state according to the discharge signal dis, the soft start circuit 40 is initialized, thereby restarting the generation of the soft start voltage VREF_SS (restart operation).

A timing setting circuit 552 sets the aforementioned detection timing, and detects the timing at which the striking operation has ended.

A striking capacitor Cstrc is connected to a capacitor terminal TSTRC. A current source 554 generates a constant current, and charges the capacitor Cstrc. A comparator 556 compares the electric potential at the TSTRC terminal with a predetermined third threshold voltage Vth3, and generates a judgment signal STRC_judge which is asserted at the detection timing. The detection timing is adjusted according to a period in which the electric potential at the TSTRC terminal reaches the threshold voltage Vth3. The detection timing is set to a timing after the timing at which the soft-start end signal SS_end is asserted.

A comparator 558 compares the electric potential at the TSTRC terminal with a predetermined fourth threshold voltage Vth4, and generates a striking end signal STRC_end which indicates whether or not the striking operation has ended.

Comparators 560, 562, and 564 detect whether or not the electric potentials at the SS terminal, the TSSW terminal, and the TSTRC terminal, respectively, have been reduced to a predetermined threshold voltage (0.2 V), i.e., whether or not the capacitors connected to these terminals have been discharged in a sure manner. An AND gate 566 outputs the logical AND of the outputs of the three comparators 560, 562, and 564, as a discharge end signal discharge_OK.

In the basic operation, in a case in which the error signal ERROR has been asserted when the judgment signal STRC_judge is asserted, an initializing circuit 570 asserts the discharge signal dis so as to initialize and the restart the soft start circuit 40.

An AND gate 572 generates the logical AND of the error signal ERROR and the soft-start end signal SS_end. That is to say, the AND gate 572 masks the error signal ERROR in a case in which it has been asserted before the completion of the soft start operation.

An AND gate 574 generates the logical AND of the judgment signal STRC_judge and a judgment end signal judge_stop. When the number of times the soft start circuit 40 has been initialized (the number of times the striking operation has been performed) reaches a predetermined number, the judgment end signal judge_stop is asserted. That is to say, the judgment signal STRC_judge is masked using the judgment end signal judge_stop, thereby preventing the number of times the striking operation is performed from becoming equal to or greater than the predetermined number.

An AND gate 576 generates the logical AND of the outputs of the AND gates 572 and 574, and outputs the logical AND thus generated to the set terminal of an RS flip-flop 578. The discharge end signal discharge_OK is input to the reset terminal of the RS flip-flop 578.

A NAND gate 582 generates the NAND of the soft start end signal SS_end and the striking end signal STRC_end. An AND gate 584 masks the output signal Q of the RS flip-flop 578 using the mask signal (NAND) generated by the NAND gate 582. That is to say, when both the soft-start end signal SS_end and the striking end signal STRC_end have been negated, the discharge signal dis is fixed at the low level.

Furthermore, the output signal Q of the RS flip-flop 578 is switched to the high-level state every time an instruction is given to initialize the soft start circuit 40. A counter 580 counts the number of times the output Q is switched to the high-level state. When the counted number reaches a predetermined number n (=2), the counter 580 asserts the judgment end signal judge_stop. The count value counted by the counter 580 is reset to zero according to the standby signal STB and the UVLO signal.

Figure 6:
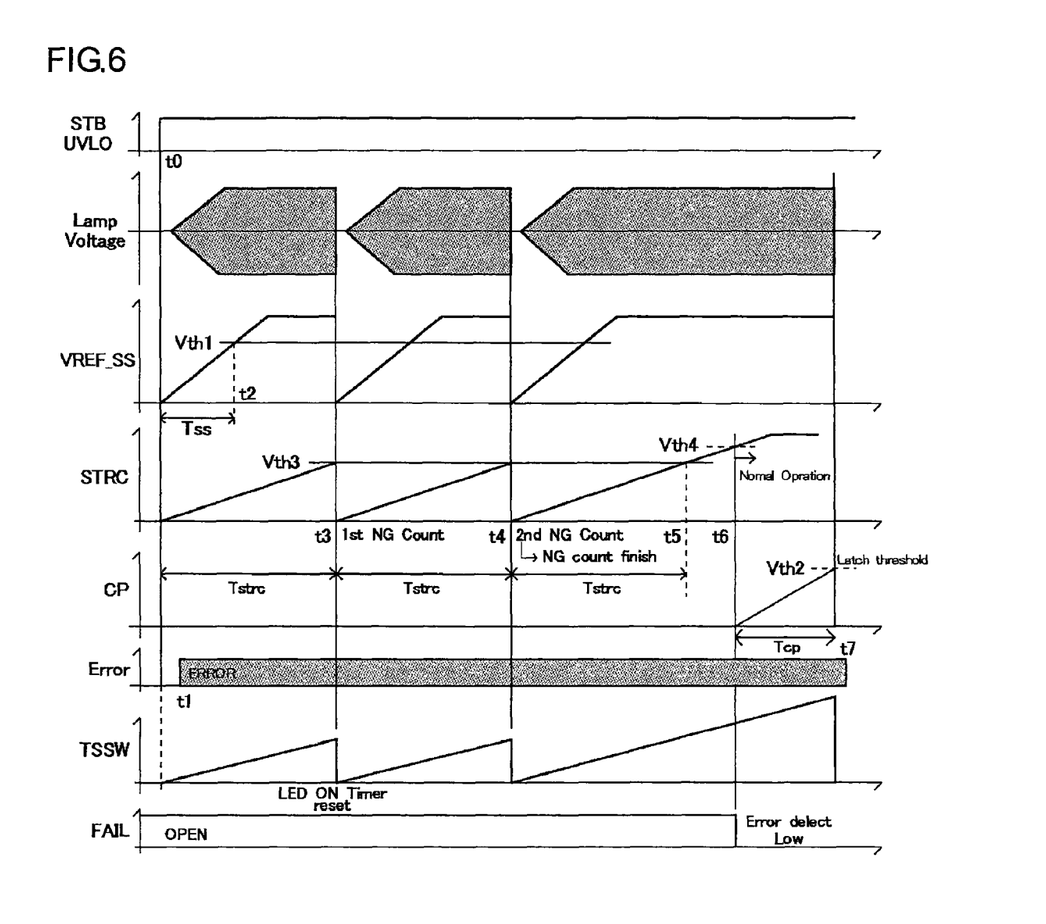
FIG. 6 is a first time chart which shows the operation of the control circuit.

The above-described is the configuration of the control circuit 30. Next, description will be made regarding the operation thereof. FIG. 6 is a first time chart which shows the operation of the control circuit 30. FIG. 6 shows the standby/UVLO signals, the lamp voltage waveform, the soft start voltage VREF_SS, the electric potential at the STRC terminal, the electric potential at the CP terminal, the error signal ERROR, the electric potential at the TSSW terminal, and the state of the Fail terminal, in this order from the top.

At the point in time t0, the standby/UVLO signals are asserted, which starts up the soft start circuit 40, and the soft start voltage VREF_SS thereby starts to rise over time. At the point in time t2 after the passage of the soft start period Tss, the soft start end signal SS_end is asserted. The timing setting circuit 552 in the striking control circuit 550 starts to charge the TSTRC terminal from the point in time t0, thereby raising the electric potential at this terminal over time. At the point in time t3 after the passage of a predetermined period of time Tstrc (Tstrc>Tss) after the point in time t0, the judgment signal STRC_judge is asserted. The point in time t3 corresponds to the aforementioned detection timing.

In a situation in which an abnormal circuit state of some kind occurs at the point in time t1, the error signal ERROR is asserted. The time chart shown in FIG. 6 shows the operation in a case in which a circuit abnormal state has continued to occur. At the detection timing t3, the error signal ERROR is asserted. Accordingly, the initializing circuit 570 asserts the discharge signal dis, which switches the states of the initializing switches SW1 through SW3 in the computation amplifier 52, thereby initializing the soft start circuit 40. When the electric potentials at the SS terminal, the STRC terminal, and the TSSW terminal are sufficiently reduced, the discharge end signal discharge_OK is asserted.

When the soft start circuit 40 is reset at the point in time t2, the count value counted by the counter 580 is incremented.

When the discharge end signal discharge_OK is asserted, the initializing circuit 570 negates the discharge signal dis. After the discharge signal dis is negated, the initializing switches SW1 through SW3 in the timing setting circuit 552 are switched to the OFF state. Accordingly, the soft start circuit 40 is restarted, thereby raising the soft start voltage VREF_SS over time.

The operation from the point in time t3 up to the point in time t4 is the same as that from the point in time to up to the point in time t3. That is to say, after the passage of the predetermined period of time Tstrc after the point in time t3, the judgment signal STRC_judge is asserted again. Also, at the detection timing of the point in time t4, the error signal ERROR has been asserted. Accordingly, the discharge signal dis is asserted again, thereby initializing the soft start circuit 40. Furthermore, the count value counted by the counter 580 is incremented. When the count value reaches an upper limit value n=2, the judgment end signal judge_stop is asserted. An arrangement may be made which allows the value of n to be selected from among multiple values. The selection operation may be performed by writing data to a register which sets the n value.

At the next detection timing t5, the error signal ERROR is masked, and accordingly, the discharge signal dis is not asserted, and the electric potential at the STRC terminal thereby continues to be raised. When the electric potential at the STRC terminal exceeds the fourth threshold voltage Vth4 at the point in time t6, the error cancel detection timer 520 asserts the striking end signal STRC_end. Upon reception of the striking end signal STRC_end thus asserted, the protection detection signal ST is asserted, which switches the transistor M51 to the ON state, thereby switching the fail terminal FAIL to the low-level state. Furthermore, when the protection detection signal ST is asserted at the point in time t6, the charge operation for the CP terminal is started. This asserts the latch signal SL at the point in time t7 after the passage of a predetermined period of time Tcp, thereby shutting down the control circuit 30.

As described above, with the inverter 100 according to the embodiment, in a case in which the error signal ERROR has been asserted at a predetermined timing after the start of the soft start operation, the soft start circuit 40 can be reset and restarted.

Furthermore, by counting the number of times the striking operation is repeatedly performed using the counter 580 thus provided, such an arrangement allows an upper limit of the number of times the striking operation is performed to be set.

Figure 7:
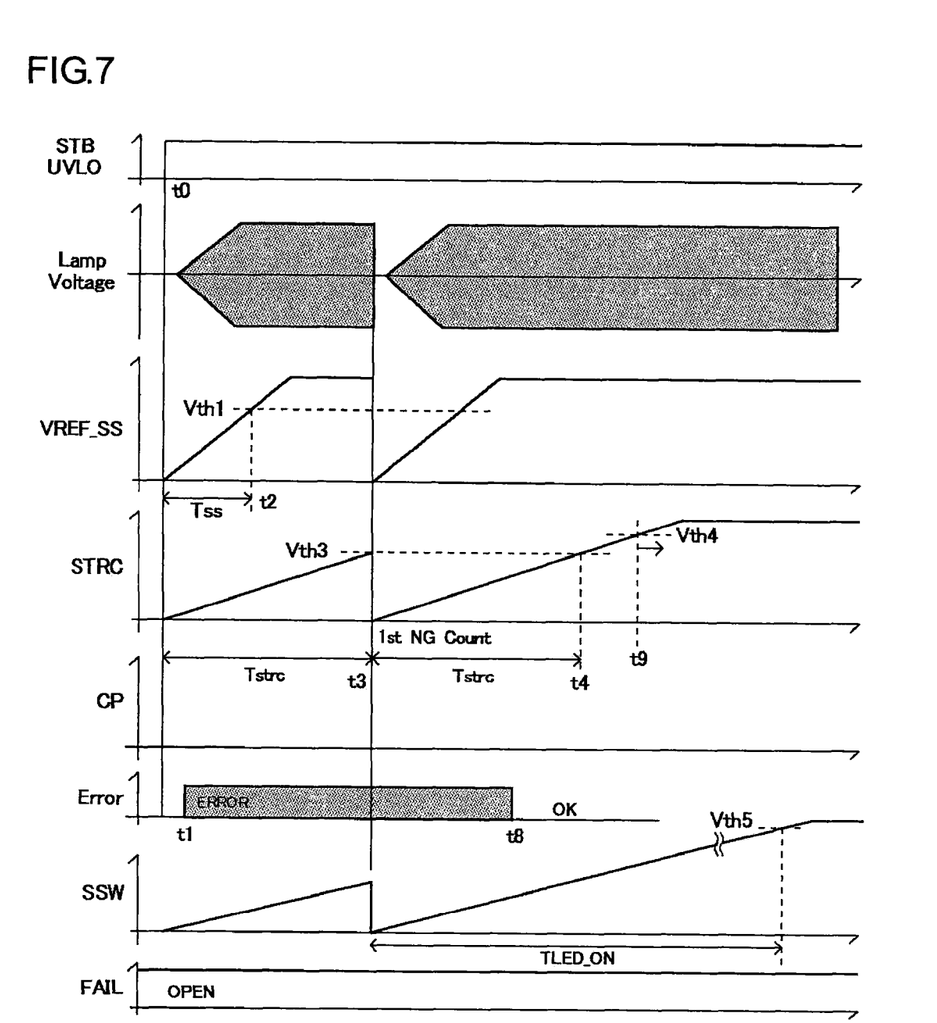
FIG. 7 is a second time chart which shows the operation of the control circuit.

FIG. 7 is a second time chart which shows the operation of the control circuit 30. The operation from the point in time t0 up to the point in time t3 shown in FIG. 7 is the same as that shown in FIG. 6. At the point in time t8, the circuit abnormal state is eliminated, and the error signal ERROR is negated. At the subsequent detection timing t4, the discharge signal dis is not asserted. Accordingly, the electric potential at the STRC terminal continues to rise, and reaches the fourth threshold voltage Vth4 at the point in time t9, at which the striking end signal STRC_end is asserted. At this time, the error signal ERROR has been negated, and accordingly, the protection detection signal ST is not asserted, thereby maintaining the fail signal FAIL in the open state. This is a point of difference from the operation shown in the time chart in FIG. 6. At the point in time t10 after the passage of the LED light-emission period TLED_ON set by the timer comparator 404 after the point in time t3, the fourth transistor Q4 is switched to the OFF state, which turns off the LED connected to the SSW terminal.

Figure 8:
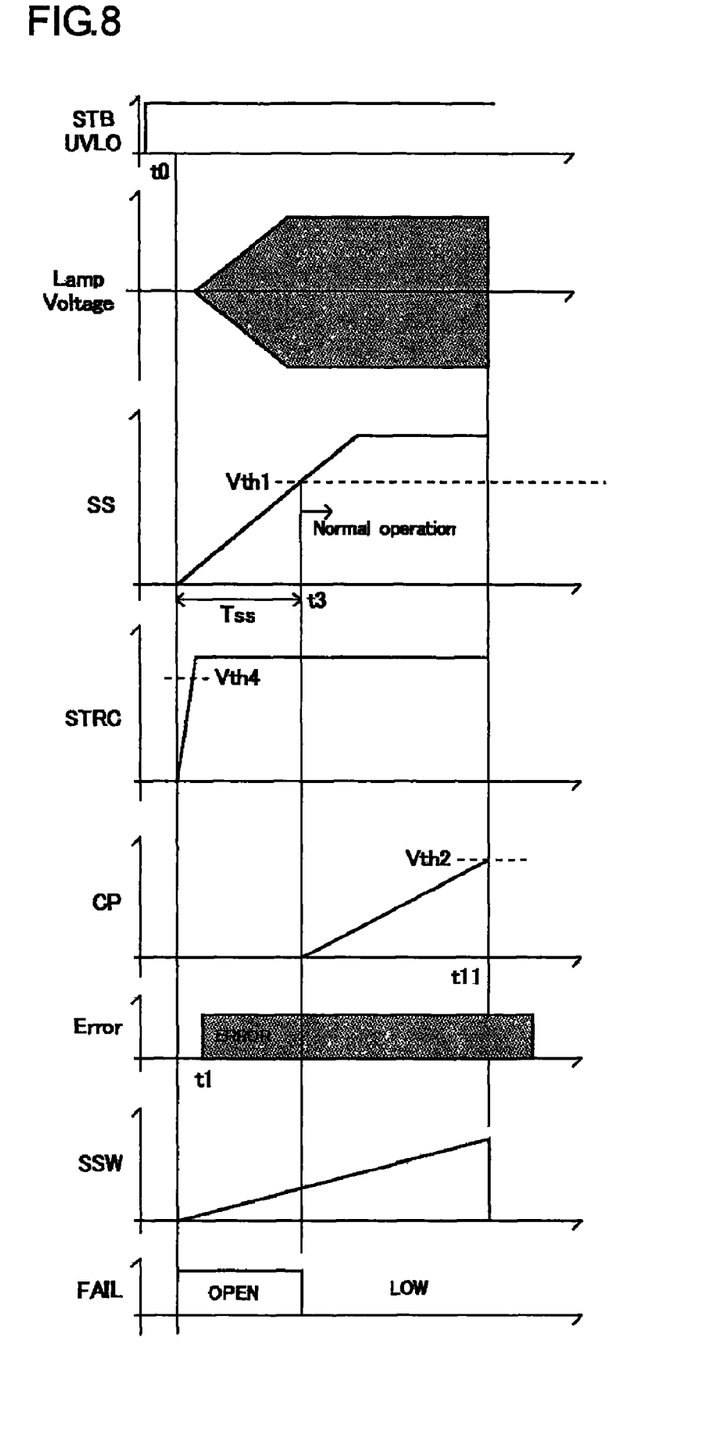
FIG. 8 is a third time chart which shows the operation of the control circuit.

FIG. 8 is a third time chart which shows the operation of the control circuit 30. The time chart shown in FIG. 8 shows the operation in a case in which the striking operation is not executed. In a case in which the STRC terminal is pulled up to the high-level state (e.g., REF4V) using an external resistor or wiring, the striking operation is disabled.

As the circuit is started up, the electric potential at the STRC terminal thus pulled up exceeds the third threshold voltage Vth4, and the striking end signal STRC_end is asserted. At the point in time t1, the error signal ERROR is asserted. When the soft start voltage VREF_SS exceeds the first threshold voltage Vth1 at the point in time t3, the soft start end signal SS_end is asserted, thereby switching the FAIL terminal to the low-level state. When the electric potential at the CP terminal reaches the second threshold voltage after the passage of a predetermined period of time Tcp after the point in time t3, the latch signal SL is asserted, and the control circuit 30 is thereby shut down (point in time t11).

The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention.

In the present embodiment, the settings of the logical values in the logic circuit, such as the high-level state and the low-level state of the signals, have been described for exemplary purposes only. The settings can be freely modified by inverting the signals using inverters or the like.

Description has been made in the embodiment regarding an arrangement in which two inverters 100 are connected to both terminals of the EEFL 210, and the EEFL 210 is driven with driving voltages having opposite phases. However, the present invention is not restricted to such an arrangement. Also, an arrangement may be made in which one terminal of the EEFL 210 is set to a fixed voltage, and the EEFL 210 is driven by a single inverter 100.

In the embodiment, the soft start circuit 40 is configured as an analog circuit using the soft start capacitor Css. However, the present invention is not restricted to such an arrangement. Also, the soft start circuit 40 may have a configuration including a signal generator which generates a digital signal having a signal value which changes according to the soft start voltage Vss shown in FIG. 4 and a D/A converter which performs digital/analog conversion of the output of the signal generator. Also, the several timer circuits, each of which performs a timing operation by charging a capacitor, may be replaced by a counter which counts a clock signal.

While the preferred embodiments of the present invention have been described using specific terms, such description is for illustrative purposes only, and it is to be understood that changes and variations may be made without departing from the spirit or scope of the appended claims.

What is claimed is:

1. A control circuit for an inverter which drives an external electrode fluorescent lamp connected to a secondary line of a transformer, the control circuit comprising:
    a soft start circuit structured to generate a soft start voltage which changes over time when the external electrode fluorescent lamp is ignited;
    a pulse modulator structured to receive a feedback voltage that corresponds to the output voltage of the inverter and the soft start voltage, and structured to adjust the duty ratio of a pulse signal such that the feedback voltage matches the soft start voltage;
    a driver structured to control the switching of the voltage at a primary coil of the transformer according to the pulse signal output from the pulse modulator; and
    a striking control circuit structured to monitor an error signal which is asserted when an abnormal state occurs, and structured to reset and restart the soft start circuit when the error signal has been asserted at a detection timing after the soft start voltage has reached a threshold voltage.

2. A control circuit according to claim 1, wherein the striking control circuit comprises a counter structured to count the number of times the soft start circuit has been reset,
    and wherein, in a case in which the count value has reached a predetermined value, the soft start circuit is prevented from being reset.

3. A control circuit according to claim 1, wherein the soft start circuit further comprises:
    a capacitor, one terminal of which is set to a fixed electric potential;
    a current source structured to charge the capacitor; and
    a first comparator structured to compare the soft start voltage, which occurs at the other terminal of the capacitor, with a predetermined first threshold voltage,
    and wherein, when the soft start circuit is reset, the striking control circuit switches an initializing switch, provided between the one terminal of the capacitor and a fixed voltage terminal, to the ON state, and when the soft start voltage is reduced to a predetermined threshold voltage, the striking control circuit switches the initializing switch to the OFF state.

4. An inverter comprising:

a transformer;

control circuit according to claim 1, which is structured to control the switching of the voltage at the primary coil of the transformer; and a voltage detection unit structured to detect the output voltage of the inverter, which is generated at the secondary coil of the transformer, and which structured to output a voltage that corresponds to the output voltage to the control circuit.

5. A liquid crystal display apparatus including:

a liquid crystal panel;

an external electrode fluorescent lamp provided as a backlight for the liquid crystal panel; and an inverter according to claim 4, the output voltage of which is supplied to the external electrode fluorescent lamp.

6. A control method for an inverter which drives an external electrode fluorescent lamp, the method comprising:

generating a soft start voltage which changes over time when the external electrode fluorescent lamp is ignited;

adjusting a duty ratio of a pulse signal such that a feedback voltage that corresponds to output voltage of the inverter matches the soft start voltage;

controlling switching of the voltage at a primary coil of a transformer according to the pulse signal; and monitoring an error signal which is asserted when an abnormal state occurs, and striking the external electrode fluorescent lamp by initializing the soft start voltage and by changing the soft start voltage over time when the error signal has been asserted at a detection timing after the soft start voltage has reached a threshold voltage.

7. A control method according to claim 6, further comprising counting the number of times the soft start voltage has been initialized, wherein, in a case in which the count value has reached a predetermined value, the soft start circuit is prevented from being reset.

\* \* \* \* \*